(12) United States Patent
Leftwich

(10) Patent No.: US 6,356,256 B1
(45) Date of Patent: Mar. 12, 2002

(54) GRAPHICAL USER INTERFACE FOR DISPLAY OF STATISTICAL DATA

(75) Inventor: James J. Leftwich, Palo Alto, CA (US)

(73) Assignee: VINA Technologies, Inc., Newark, CA (US)

( * ) Notice: Subject to any disclaimer, the term of this patent is extended or adjusted under 35 U.S.C. 154(b) by 0 days.

(21) Appl. No.: 09/234,047

(22) Filed: Jan. 19, 1999

(51) Int. Cl.[7] .................................................. G09G 5/08
(52) U.S. Cl. ........................ 345/157; 345/1.1; 345/716; 345/856
(58) Field of Search .......................... 345/339; 395/140, 395/182; 707/3; 324/379

(56) References Cited

U.S. PATENT DOCUMENTS

| | | | | |
|---|---|---|---|---|
| 4,404,551 A | * | 9/1983 | Howse | 340/711 |
| 5,550,964 A | * | 8/1996 | Davoust | 395/140 |
| 5,619,631 A | * | 8/1997 | Schott | 395/140 |
| 5,684,945 A | * | 11/1997 | Chen | 395/182 |
| 5,845,277 A | * | 12/1998 | Pfeil | 707/3 |
| 5,898,307 A | * | 4/1999 | Taraki et al. | 324/379 |
| 5,910,801 A | * | 6/1999 | Rosenburg | 345/339 |
| 6,122,273 A | * | 9/2000 | Cantwell et al. | 340/359 |

* cited by examiner

Primary Examiner—Steven Saras
Assistant Examiner—C J Maier
(74) Attorney, Agent, or Firm—Blakely, Sokoloff, Taylor & Zafman LLP; Jordan M. Becker

(57) ABSTRACT

A graphical user interface (GUI) is described for providing access to performance data for T1 or E1 communication lines. Data, such as error statistics, usage statistics, and burst measurements can be displayed graphically in a manner that can be easily assimilated by a user. The GUI is generated by a Java applet, to enable remote viewing of the data over the Internet or other network. A user can zoom in on a portion of a displayed plot of data by clicking with a cursor control device and dragging the cursor over a selected portion of the plot. The plot is automatically redisplayed with the selected portion enlarged. Alternatively, the user may click on a point on the graph to zoom in on a portion of the graph centered at the selected point. A first and second plot of data are displayed as a line graph and a filled region, respectively, to provide visual contrast between the plots.

19 Claims, 5 Drawing Sheets

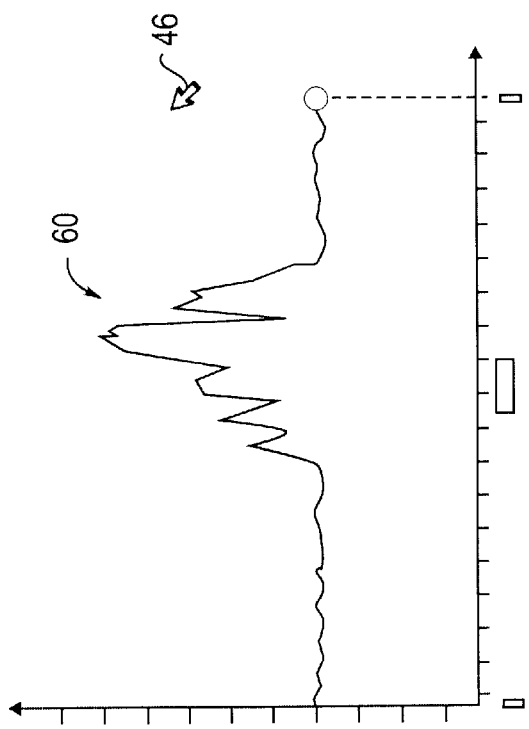
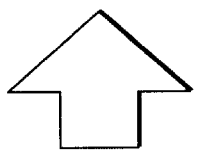
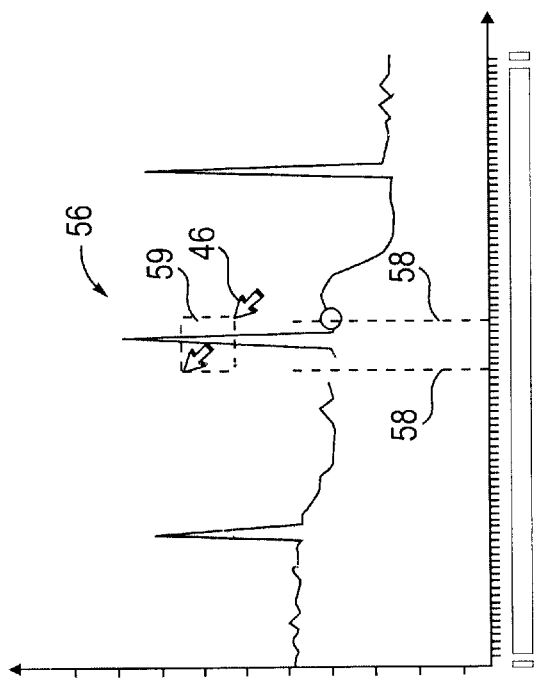
FIG. 5B
FIG. 5A

GRAPHICAL USER INTERFACE FOR DISPLAY OF STATISTICAL DATA

FIELD OF THE INVENTION

The present invention pertains to graphical user interfaces for graphically displaying data. More particularly, the present invention relates to a graphical user interface for accessing and displaying performance history data relating to T1 communication lines.

BACKGROUND OF THE INVENTION

The ability to display data so that it can be quickly and easily assimilated by a user is an important goal in the design of graphical user interfaces (GUIs). One application in which a GUI may be useful is in telecommunications. For example, communications equipment for transmitting voice or data over long distances may require monitoring by a telecommunications carrier or other interested party. Such equipment may provide a facility to collect performance data, such as error statistics or usage statistics. A GUI may be provided to allow a user to access the performance data. It is desirable, therefore, to provide an improved GUI, which allows data relating to telecommunications lines and other types of data to be displayed graphically in a manner that can be easily assimilated by a user.

SUMMARY OF THE INVENTION

The present invention includes a method and apparatus for displaying information on a display device, such that the information is easily perceivable by a user. A line graph that corresponds to a first set of data points is displayed on the display device. A region having a fill effect is also displayed in proximity with the line graph. A boundary of the region is representative of a line graph that corresponds to a second set of data points.

The present invention also includes a method and apparatus for displaying information on a display device at an altered scale. A first graph of a set of data is displayed on the display device at a first scale. A user-positionable indicator, such as a cursor, is also displayed on the display device concurrently with the first graph. A user input associated with the user-positionable indicator is then received. The user input specifies a portion of the first graph. In response to the user input, a second graph is displayed on the display device, representing the specified portion of the first graph at a second scale that is different from the first scale. In particular embodiments, the foregoing operations are performed to generate a zoomed view of the specified portion of the first graph.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIGS. 5A and 5B illustrate the effect of the zooming function in response to a user input.

DETAILED DESCRIPTION

Figure 1:
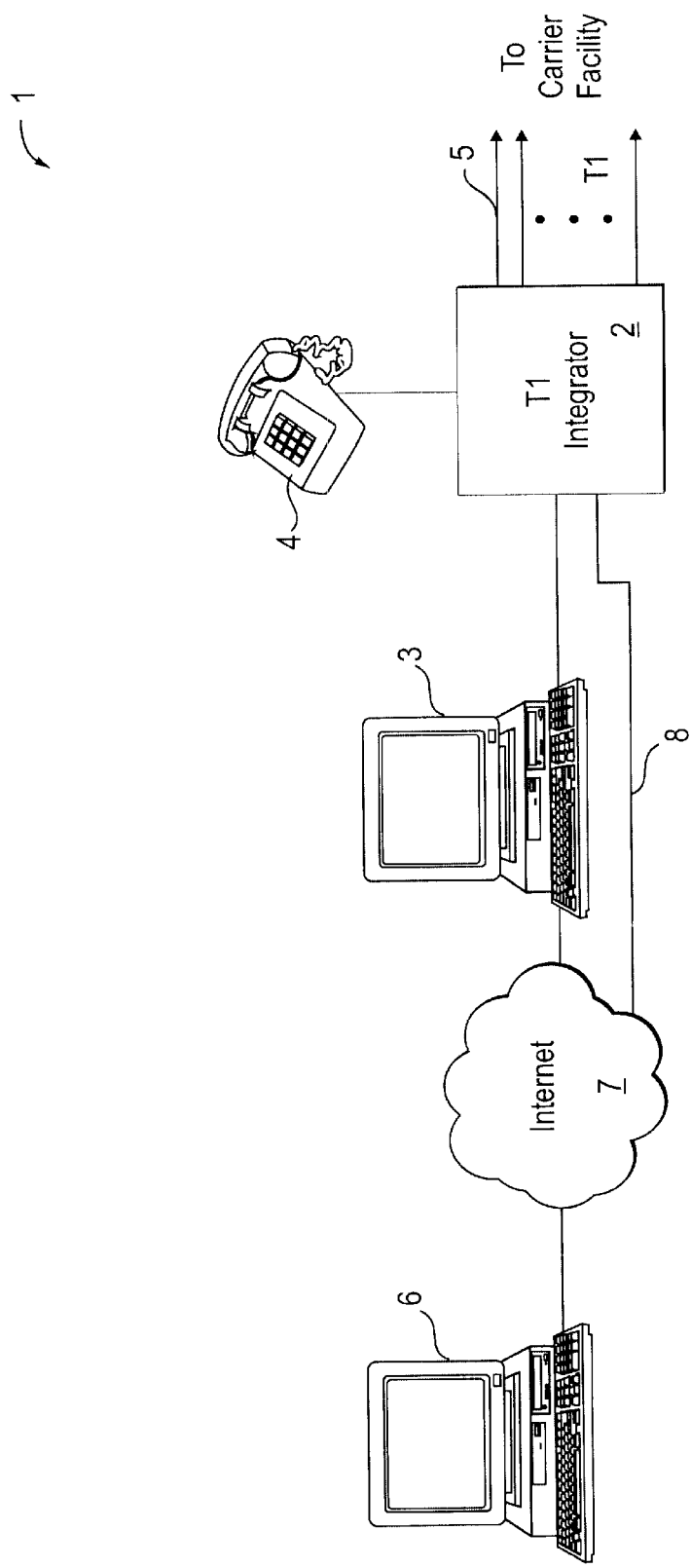
FIG. 1 illustrates a system in which the GUI of the present invention can be implemented to monitor T1 performance data.

Described herein are a method and apparatus for displaying using a graphical user interface (GUI) for allowing a user to view data. The GUI is described in the context of accessing and viewing performance history data for T1 communication lines, or their European counterpart, E1 communication lines. For purposes of simplicity, the term "T1 lines" is henceforth used in this description to mean "T1 and/or E1 lines". In addition, it will be recognized that the present invention is not limited in application to T1 communications or even the telecommunications field generally. For example, the embodiments described herein may be easily adapted to display essentially any other type of data that can be represented graphically.

In the telecommunications field and in other applications, it may be desirable to display patterns of data collected over time or data collected in large, linearly arranged amounts. Examples of such data are error and usage statistics. Long periods of time with relatively small amounts of change may be interspersed with short periods of high activity. Different densities of data in a particular region of a data display make it desirable to provide multiple views. In addition, it is desirable to provide a data visualization tool in which a user can quickly and easily navigate between larger and smaller scales of visualized data, to be able to effectively "zoom" in and out or move forward and backward through various visualized data.

Accordingly, as will be described in greater detail below, aspects of the present invention may be embodied in software. The software may be implemented, at least in art, as an application written in the Java programming language. Thus, the present invention may be carried out in a computer system in response to its processor executing sequences of instructions contained in memory. The instructions may be executed from memory and may be loaded from a persistent store, such as a mass storage device and/or from one or more other remote computer systems (collectively referred to as "host computer system"). In the latter case, for example, a host computer system may transmit a sequence of instructions to the ("target") computer system in response to a message transmitted to the host computer system over a network by target computer system. As the target computer system receives the instructions via the network connection, the target computer system stores the instructions in memory. The target computer system may store the instructions for later execution or execute the instructions as they arrive over the network.

In some cases, the downloaded instructions may be directly supported by the processor of the target computer system. Consequently, execution of the instructions may be performed directly by the processor. In other cases, the instructions may not be directly executable by the processor. Under those circumstances, the instructions may be executed by causing the processor to execute an interpreter that interprets the instructions or by causing the processor to execute instructions which convert the received instructions to instructions which can be directly executed by the processor.

In some embodiments of the present invention, hardwired circuitry may be used in place of, or in combination with, software instructions to implement the present invention. Thus, the present invention is not limited to any specific combination of hardware circuitry and software, nor to any particular source for the instructions executed by a computer system.

FIG. 1 illustrates a geographically distributed system 1 in which the software application can be used advantageously. A telecommunications customer, such as a business enterprise, uses one or more T1 communication lines 5 to transmit and receive voice or data or both. The remote end (not shown) of the T1 lines may be located at the facilities of a telecommunications carrier, for example. Accordingly, a T1 integrator 2, which is located at the customer premises, inputs voice data from a conventional telephone 4 and non-voice data from a conventional computer 3, integrates the voice data and the non-voice data, and transmits the integrated data over the T1 lines 5. The computer 3 may be, for example, a personal computer (PC). The details of the operation and construction of the T1 integrator 2 are not germane to the present invention, except as described below. Computer system 3 is also connected to a remote computer system 6 via the Internet 7. Note that in other embodiments, essentially any other type of data communication network may be substituted for the Internet 7, such as a wide area network (WAN) or a local area network (LAN). The T1 integrator 2 may also have a direct link 8 to the Internet 7, in which case the T1 Integrator 2 is assigned its own Internet Protocol (IP) address.

One ancillary function of the T1 integrator is to generate various types of performance history data relating to the T1 lines 5, such as error statistics, usage statistics, and burst measurements. The above-mentioned software application gathers such data and, in response to user inputs, displays it graphically on a display device of a given computer system, such as (local) computer system 3 or (remote) computer system 6. For example, the application may both reside and execute locally on computer system 3. The data generated by T1 integrator 2 may be maintained in a database in computer system 3 or in any other accessible location. Alternatively, portions of the software application may be downloaded to, and executed on, remote computer 6 for purposes of displaying the data. As noted, the software application may be implemented, at least in part, in the Internet-oriented Java programming language. At least the downloadable portions of the application may be implemented as Java "applets".

Thus, a user of remote computer system 6 may access a conventional hypertext mark-up language (HTML) web page residing on computer system 3 to access the performance data generated by the T1 integrator 2. In response to an appropriate user input, such as the user's clicking on a hypertext link, a Java applet forming a data viewing component (i.e., the GUI) is downloaded from computer system 3 to computer system 6, to display the data on the display device of computer system 6. Alternatively, the software application may reside entirely in remote computer system 6, which may be configured to directly access the T1 integrator 2 via the Internet 7 and link 8. In that case, local computer system 3 may be eliminated from the system 1. Note that many other implementations of the system 1 are possible.

Figure 2:
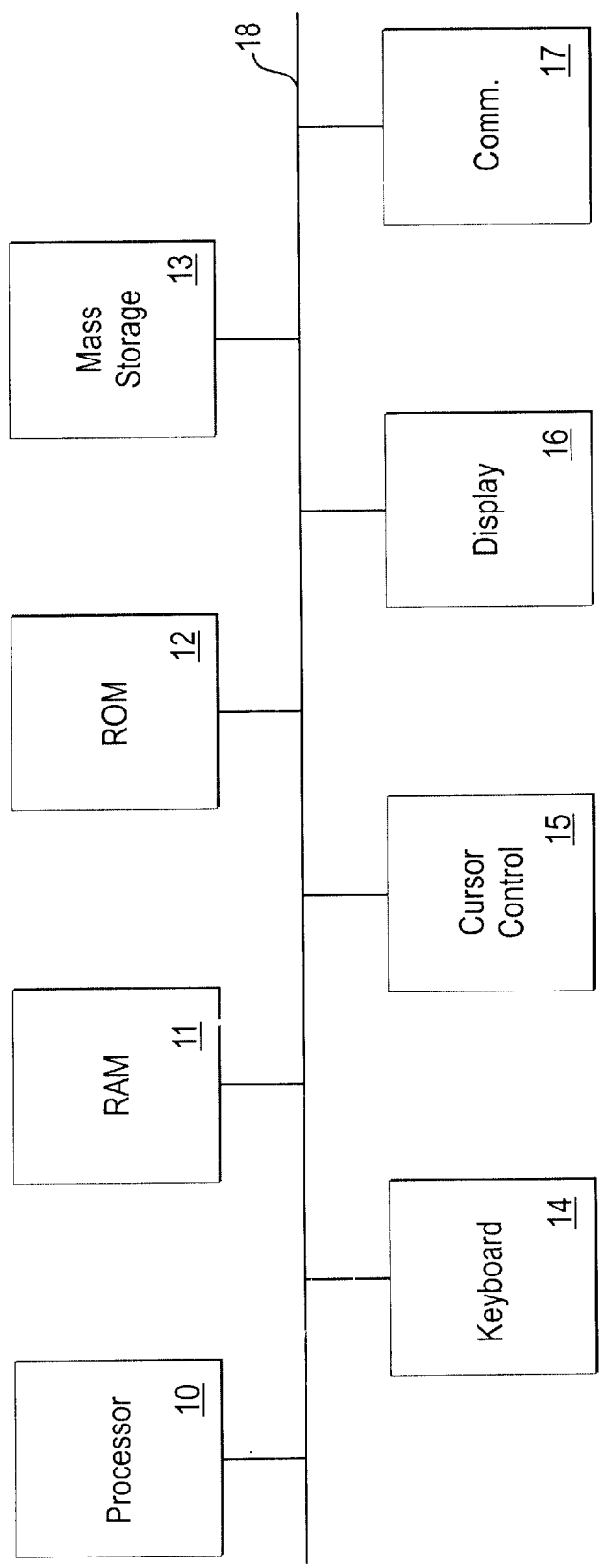
FIG. 2 is a block diagram of an example of a computer system in which the GUI can be stored or executed.

FIG. 2 illustrates an example of a computer system in which the software application may be implemented. Hence, the system of FIG. 2 may represent either computer system 3 or computer system 6 or both. The illustrated computer system includes a microprocessor 10, random access memory (RAM) 11, and read-only memory (ROM) 12, each connected to a bus system 18. The bus system 18 may include one or more buses connected to each other through various bridges, controllers and/or adapters, such as are well-known in the art. For example, the bus system may include a system bus that is connected through an adapter to one or more expansion buses, such as a Peripheral Component Interconnect (PCI) bus or the like. Also coupled to the bus system 18 are a mass storage device 13, a keyboard 14, a cursor control device 15, a display device 16, and a communication device 17.

Mass storage device 13 may include any suitable device for storing large volumes of data, such as a magnetic disk or tape, magneto-optical (MO) storage device, or any of various types of Digital Versatile Disk (DVD) or compact disk ROM (CD-ROM) storage. The cursor control device 15 may be any suitable device for enabling a user to position a cursor or pointer on the display device 17, such as a mouse, trackball, touchpad, stylus with light pen, or the like, and for enabling the user to enter other user inputs, such as selection signals. The display device 16 may be any suitable device for displaying alphanumeric, graphical and/or video data to a user, such as a cathode ray tube (CRT), a liquid crystal display (LCD), or the like, and associated controllers. The communication device 17 may be any device suitable for or enabling the computer system to communicate data with a remote processing system, such as a conventional telephone modem, a cable television modem, an Integrated Services Digital Network (ISDN) adapter, a Digital Subscriber Line (xDSL) adapter, a network interface card (NIC), a Ethernet adapter, or the like.

Figure 3A:
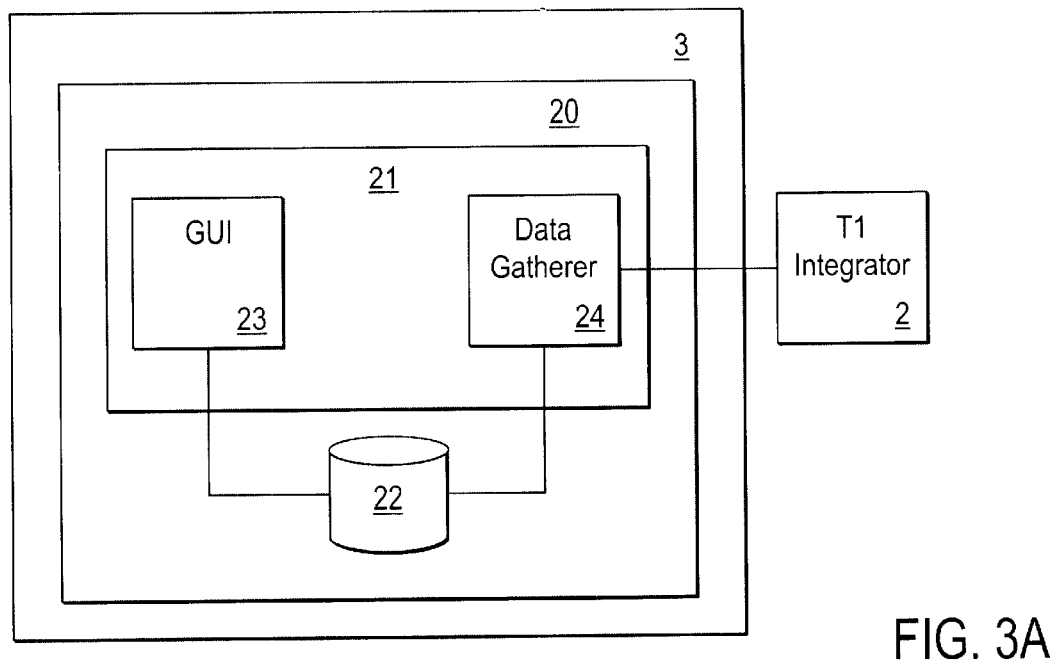
FIG. 3A is a block diagram illustrating a software application, implemented in a local computer system, for gathering and displaying T1 performance data.

FIG. 3A illustrates an embodiment in which the software application is implemented entirely within local computer system 3. In particular, local computer system 3 includes a memory 20 in which the software application 21 is stored. Memory 20 may represent RAM, ROM, a mass storage device, or a combination of such devices. The software application 21 includes a data gathering component 24 and a display generator component, or GUI, 23. The data gathering component 24 is functionally coupled to the T1 integrator 2 and is used to gather performance data from the T1 integrator and to store such data in the database 22. The database 22 may be maintained within local computer system 3 or remotely at any other suitable location. The GUI 23 is used to access the data stored in the database 22 in response to user inputs and to display the data graphically in an appropriate format.

Figure 3B:
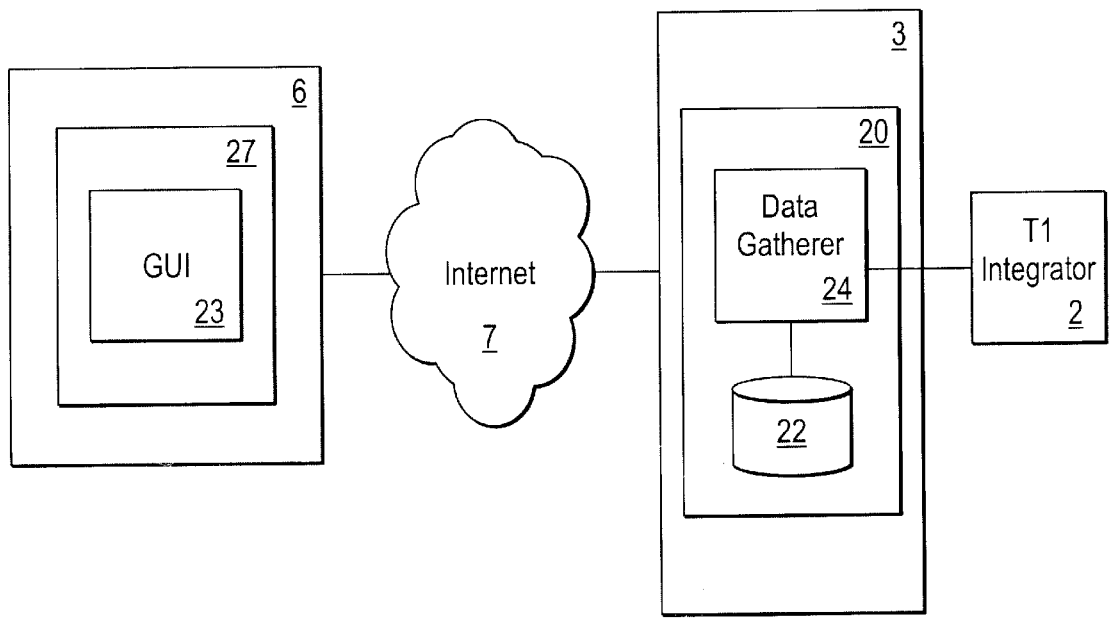
FIG. 3B is a block diagram showing a software application, distributed over the Internet, for gathering and displaying T1 performance data.

FIG. 3B illustrates an embodiment in which the software application is distributed across the Internet as it executes. Assume that a user of computer system 6 wishes to access data relating to the T1 integrator 2. Accordingly, in response to an appropriate user input that computer system 6, the GUI 23 is downloaded from computer system 3 over the Internet 7 to a memory 27 in computer system 6, in the form of a Java applet. As with memory 20, memory 27 may represent RAM, ROM, a mass storage device, or a combination of such devices. The GUI 23 then executes on remote computer system 6 to allow the user to view the data. Note that in some embodiments, the GUI 23 may normally be stored on remote computer system 6.

As will now be described in further detail, the GUI 23 is configured to provide displays of data in a manner that can be easily assimilated by a user. In various situations, it may be desirable to display multiple sets of data on a single graph. One technique which has been used to do this is to represent multiple sets of data as multiple line graphs, which distinguished by using slightly different variations of the same type of line. This approach often produces a display in which it is difficult for the user to visually discern the different sets of data, particularly when the number of sets of data is large. Accordingly, the GUI 23 of the present invention is configured to generate a display of two or more sets of data in a more visually contrasting manner.

Figure 4:
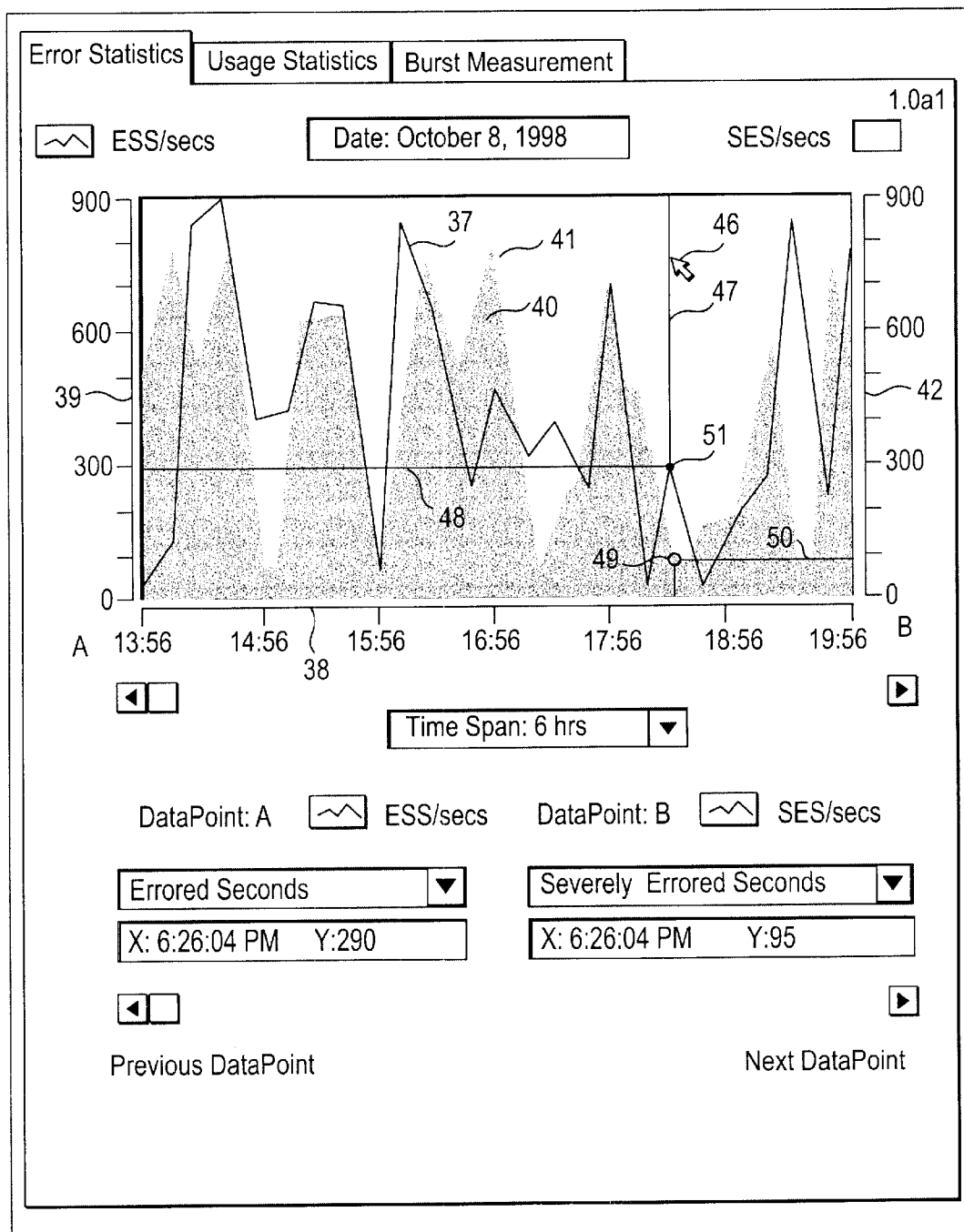
FIG. 4 shows a display window with two visually contrasting plots of data.

FIG. 4 illustrates an example of such a display. The display includes a window 36, which is produced in response to a request from a user to display plots of two (in this example) sets of data. In the illustrated example, the window 36 includes a graph of error statistics with respect to a horizontal axis 38, which represents time, and two vertical axes 39 and 42, which represent an error parameter. A plot of a first data set is represented by line graph 37. Rather than representing the plot of the second data set as another line graph, the plot is displayed in the form of a filled region 40, the boundary 41 of which is representative of a line graph. The fill pattern and/or the color of region 40 are chosen to provide high visual contrast with line graph 37 and may be displayed according to specified user preferences.

A cursor 46 is also displayed in the window 36 and may be positioned by the user to access particular data points. As the cursor 46 is moved within the window 36, it is automatically tracked by three displayed indicators, i.e., lines 47, 48, and 50, which indicate the position of the cursor 46 along the horizontal axis 38 and along the vertical axes 39 and 42, respectively. In particular, indicator (vertical line) 47 indicates to the user the horizontal position of the cursor 46 along the horizontal (time) axis 38. Indicator 48 is drawn horizontally from the point 51 at which indicator 47 intersects line graph 37 to the left vertical axis 39. Indicator 50 is drawn horizontally from the point 49 at which indicator 47 intersects the boundary 41 of filled region 40 to the right vertical axis 42.

Thus, by moving the cursor 46 left or right over the graph, the user can acquire an instant visual impression of the relationship between the two plots over time, based on the relative positions of indicators 47, 48 and 50. Further, by entering a particular input signal, such as the clicking of a mouse button, the user can cause the cursor to be "frozen" (stopped) on the display and the values of the data plots at the cursor position to be displayed in appropriate data fields of window 36.

Referring now to FIG. 5, the GUI 23 also provides the ability for a user to "zoom in on" (enlarge) a portion of a plot. FIG. 5A illustrates an example of a plot as initially displayed to a user. Assume that the user wishes to view in greater detail the portion of plot 56 which lies between lines 58. Lines 58 are not displayed but are shown in FIG. 5A for purposes of explanation. The user can simply click and drag the mouse over that portion of the plot to initiate a zoom request. In response to this input, the GUI 23 draws a temporary visual box 59 delimiting the region over which the cursor 46 has been dragged. The GUI 23 then examines the beginning horizontal value and the ending horizontal value and redraws the display to the smallest possible scale that will contain the data points within the user-specified box 59. The same operation may be performed for the vertical axis. Accordingly, the display of FIG. 5A is redrawn as shown in FIG. 5B, in which plot 60 represents the portion of plot 56 within the user-specified box 59. The display is automatically redrawn, such that the indicated portion is stretched to fill the allocated display area. The scaling of both axes is automatically adjusted so that the minimum and maximum vertical and horizontal values of the zoomed display match those of the user-specified box 59.

If desired, the user may also zoom in on a region by simply clicking on a portion of the graph to freeze a data point as described above. In response, the GUI 23 causes the display to be re-scaled and displayed centered about the frozen data point. In either case the display automatically redraws itself stretching the indicated portion to fill the display/graph. Resolution is enhanced and the value increments change along with the corresponding change in the layout of the axis tick marks as appropriate. It will also be recognized that the above-described zoom feature may be used to enlarge two or more visually contrasting plots such as described above.

Thus, a method and apparatus for displaying information, in the context of a graphical user interface for accessing performance history data for T1 communication lines, have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of displaying information on a display device at an altered scale, the method comprising:

causing the display device to display a first graph of a set of data at a first scale, the first graph including a first axis and a second axis, the first axis and the second axis associated with a first plot of data points, the first axis further associated with a second plot of data points;

causing a user-positionable indicator to be displayed on the display device concurrently with said first graph;

receiving user input associated with the user-positionable indicator, the user input for specifying a portion of the first graph;

responding to the user input by causing the display device to display a second graph representing the specified portion of the first graph at a second scale different from the first scale;

determining a current location of the cursor on the display device;

causing the display device to display a first indicator to indicate a location on the first axis that corresponds to the current location of the cursor, the location on the first axis representing both a first value of a data point of the first plot of data points and a first value of a data point of the second plot of data points;

causing the display device to display a second indicator to indicate a location on the second axis, the location on the second axis representing a second value of the data point of the first plot of data points, the second value corresponding to the first value; and causing the display device to display a third indicator to indicate a second value of the data point of the second plot of data points, corresponding to the first value of the second plot of data points.

2. A method as recited in claim 1, wherein the user input comprises user input specifying a movement of the user-positionable indicator relative to the first graph.

3. A method as recited in claim 1, wherein the user input specifies a region of the first graph as the portion of the first graph.

4. A method as recited in claim 1, wherein the user input specifies a point on the first graph as the portion of the first graph.

5. A method as recited in claim 1, wherein at least one of the first graph and the second graph comprises a line graph.

6. A method as recited in claim 1, wherein said causing the display device to display the first graph comprises:
   causing the display device to display a line graph representing a first plot of data points; and
   causing the display device to display a region in proximity with the line graph, the region having a fill effect, such that a boundary of the region represents a line graph representing second plot of data points.

7. A method as recited in claim 1, wherein the set of data comprises performance data of a T1/E1 communication link.

8. A method of enabling a target computer to display information on a display device, the method comprising the step of transmitting sequences of instructions from a host computer to the target computer, the sequences of instructions including instructions which, when executed on the target computer, cause the target computer to perform the method recited in claim 1.

9. A computer-implemented method of displaying data on a display device of a processing system, the method comprising:
   generating a first graph of a set of data points;
   causing the display device to display the first graph at a first scale, the first graph including a first axis and a second axis, each associated with a first plot of data points, wherein the first axis is also associated with a second plot of data points;
   causing a cursor to be displayed on the display device concurrently with display of the first graph;
   receiving user input indicating a movement of the cursor, the user input specifying a region of the first graph;
   in response to the user input, generating a second graph representing a zoomed view of the specified portion of the first graph and causing the display device to display the second graph;
   determining a current location of the cursor on the display device;
   causing the display device to display a first indicator to indicate a location on the first axis that corresponds to the current location of the cursor, the location on the first axis representing a first value of a data point of the first plot of data points, the location on the first axis further representing a first value of a data point of the second plot of data points;
   causing the display device to display a second indicator to indicate a location on the second axis, the location on the second axis representing a second value of the data point of the first plot of data points, the second value corresponding to the first value; and
   causing the display device to display a third indicator to indicate a second value of the data point of the second plot of data points, the second value corresponding to the first value of the second plot of data points.

10. A method as recited in claim 9, wherein at least one of the first graph and the second graph comprises a line graph.

11. A method as recited in claim 9, wherein said causing the display device to display the second graph comprises replacing the first graph on the display device with the second graph.

12. A method as recited in claim 9, wherein said causing the display device to display the first graph comprises:
   causing the display device to display a line graph representing a first plot of data points; and
   causing the display device to display a region in proximity with the line graph, the region having a fill effect, such that a boundary of the region represents a second plot of data points.

13. A method as recited in claim 9, wherein the set of data points comprises performance data of a T1/E1 communication link.

14. A method of enabling a target computer to display data on a display device, the method comprising the step of transmitting sequences of instructions from a host computer to the target computer, the sequences of instructions including instructions which, when executed on the target computer, cause the target computer to perform the method recited in claim 9.

15. An apparatus for displaying data on a display device of a processing system, the apparatus comprising:
   means for generating a first graph of a set of data points, the first graph including a first axis and a second axis, the first and second axes associated with a first plot of data points, the first axis further associated with a second plot of data points;
   means for causing the display device to display the first graph at a first scale;
   means for causing a cursor to be displayed on the display device concurrently with display of the first graph;
   means for receiving user input indicating a movement of the cursor, the user input specifying a region of the first graph;
   means for generating, in response to the user input, a second graph representing a zoomed view of the specified portion of the first graph and causing the display device to display the second graph;
   means for determining a current location of the cursor on the display device;
   means for causing the display device to display a first indicator to indicate a location on the first axis that corresponds to the current location of the cursor, the location on the first axis representing a first value of a data point of the first plot of data points and a first value of a data point of the second plot of data points;
   means for causing the display device to display a second indicator to indicate a location on the second axis, the location on the second axis representing a second value of the data point of the first plot of data points, the second value corresponding to the first value; and
   means for causing the display device to display a third indicator to indicate a second value of the data point of the second plot of data points, corresponding to the first value of the second plot of data points.

16. An apparatus as recited in claim 15, wherein at least one of the first graph and the second graph comprises a line graph.

17. An apparatus as recited in claim 15, wherein the means for causing the display device to display the second graph comprises means for replacing the first graph on the display device with the second graph.

18. An apparatus as recited in claim 15, wherein the means for causing the display device to display the first graph comprises:
   means for causing the display device to display a line graph representing a first plot of data points; and
   means for causing the display device to display a region in proximity with the line graph, the region having a fill effect, such that a boundary of the region represents a line graph representing second plot of data points.

19. An apparatus as recited in claim 15, wherein the set of data points comprises performance data of a T1/E1 communication link.

* * * * *